US012461489B2

(12) United States Patent
Jeanneret et al.

(10) Patent No.: US 12,461,489 B2
(45) Date of Patent: Nov. 4, 2025

(54) WHEEL FOR A REDUCED-INERTIA ESCAPEMENT SYSTEM

(71) Applicant: Nivarox-FAR S.A., Le Locle (CH)

(72) Inventors: Laurent Jeanneret, Villers-le-Lac (FR); Stéphane Renard, Chambrelien (CH)

(73) Assignee: Nivarox-FAR S.A., Le Locle (CH)

( * ) Notice: Subject to any disclaimer, the term of this patent is extended or adjusted under 35 U.S.C. 154(b) by 346 days.

(21) Appl. No.: 18/175,861

(22) Filed: Feb. 28, 2023

(65) Prior Publication Data

US 2023/0400812 A1 Dec. 14, 2023

(30) Foreign Application Priority Data

Jun. 8, 2022 (EP) .................................... 22177838

(51) Int. Cl.
*G04B 13/02* (2006.01)
*G04B 15/14* (2006.01)

(52) U.S. Cl.
CPC ........... *G04B 13/027* (2013.01); *G04B 15/14* (2013.01)

(58) Field of Classification Search
CPC .... G04B 13/027; G04B 15/14; G04B 13/025; G04B 15/02; G04B 13/02; G04B 13/00
See application file for complete search history.

(56) References Cited

U.S. PATENT DOCUMENTS

| | | | | |
|---|---|---|---|---|
| 2,363,993 A | 11/1944 | Rhodes | | |
| 3,853,714 A | 12/1974 | Shimada et al. | | |
| 7,708,454 B2 * | 5/2010 | Marmy | G04B 15/14 | 368/170 |
| 11,906,929 B2 * | 2/2024 | Zaugg | G04B 15/14 | |
| 12,032,334 B2 * | 7/2024 | Lederer | G04B 15/08 | |
| 2016/0251215 A1 | 9/2016 | Dubois et al. | | |
| 2018/0231936 A1 * | 8/2018 | Fukuda | G04B 15/14 | |
| 2019/0023564 A1 | 1/2019 | Dubois et al. | | |

FOREIGN PATENT DOCUMENTS

| | | |
|---|---|---|
| CH | 708 827 A2 | 5/2015 |
| DE | 1 981 274 U | 3/1968 |
| GB | 352876 A | 7/1931 |
| JP | 48-44138 A | 6/1973 |

OTHER PUBLICATIONS

European Search Report issued Oct. 25, 2022 in European Application 22177838.4 filed on Jun. 8, 2022, 3 pages (with English Translation of Categories of Cited Documents).
Japanese Notice of Refusal issued Feb. 13, 2024 in Japanese Patent Application No. 2023-035214 (with unedited computer-generated English Translation), 8 pages.

* cited by examiner

*Primary Examiner* — Edwin A. Leon
(74) *Attorney, Agent, or Firm* — Oblon, McClelland, Maier & Neustadt, L.L.P.

(57) ABSTRACT

A wheel for an escapement system including a hub intended to be mounted with a staff for rotation therewith, the staff being intended to be subjected to a mechanical torque, a felloe, at least two arms extending from the hub to the felloe, and a toothing formed by a plurality of teeth. The wheel for the escapement system includes at least one recess on at least one of the faces thereof, the recess extending from the felloe to the hub.

12 Claims, 1 Drawing Sheet

WHEEL FOR A REDUCED-INERTIA ESCAPEMENT SYSTEM

CROSS-REFERENCE TO RELATED APPLICATION

This application claims priority to European Patent Application No. 22177838.4 filed on Jun. 8, 2022, the entire disclosure of which is hereby incorporated herein by reference.

TECHNICAL FIELD OF THE INVENTION

The invention relates to the horology field, and in particular to mechanical horological movements.

More particularly, the invention relates to a wheel for a timepiece escapement system.

TECHNOLOGICAL BACKGROUND

Escape wheels are well known in the horological field and are intended to be connected to a mainspring which supplies it with energy in order to maintain the oscillations of a balance, potentially by means of a pallet-lever.

More particularly, within the scope of the Swiss lever escapement, the escape wheel has teeth distributed around the periphery of a felloe connected to a hub by radial branches. The pallet-lever has pallets intended to cooperate with the teeth of the escape wheel.

With each alternation of the balance, the escape wheel follows the following cycle: it is released from the stop position thereof against the first pallet, then accelerated and driven by the gear train in order to catch up firstly with the pallet-lever and then indirectly with the balance by way of the latter. It drives the balance before ejecting it, and finally it finishes its journey by abutting against the second pallet of the pallet-lever.

Each of these repeated cycles is thus a succession of steps of the wheel, which starts, stops, and so on. It is thus understood that the lowest possible inertia of this wheel set plays an important role in ensuring a rapid start-up and catch-up with the balance, guaranteeing limited losses in efficiency.

Such a problem is known and has been addressed in the past in various ways by a person skilled in the art, namely by producing a skeletonised escape wheel or by producing an escape wheel made of a low-density material such as silicon, with the aim being to reduce inertia as much as possible.

Although these solutions are satisfactory, the manufacture of such an escape wheel poses some difficulties. In particular, in addition to taking a relatively long time to machine, the resulting components can be more fragile due to the skeletonisation or the properties of the silicon material.

SUMMARY OF THE INVENTION

The main purpose of the present invention is to provide a wheel for an escapement system that has reduced inertia compared to the wheels currently used, while remaining easy and fast to manufacture.

To this end, the invention relates to a wheel for an escapement system comprising a hub intended to be mounted with a staff for rotation therewith, the staff being intended to be subjected to a mechanical torque, a felloe, at least two arms extending from the hub to the felloe, and a toothing formed by a plurality of teeth, characterised in that said wheel for the escapement system comprises at least one recess on at least one of the faces thereof, the recess extending from the felloe to the hub.

According to other advantageous alternative embodiments of the invention:

- the wheel has a thickness of at least 0.10 mm;
- the at least one recess has a height of between 0.02 mm and 0.05 mm;
- the at least one recess extends partly over the felloe and forms a border at the edge of the felloe of at least 0.02 mm;
- the wheel comprises at least two arms, and preferably four arms;
- the wheel comprises a recess on the two faces thereof, referred to as the front face and the rear face;
- the recesses are symmetrical relative to a horizontal plane halfway through the thickness of the escape wheel;
- the recesses are asymmetrical relative to a horizontal plane halfway through the thickness of the escape wheel;
- the wheel is made of a material selected from steel, silicon or a metal alloy;
- the at least one recess is produced by milling, turning, sinking, laser machining, DRIE or LIGA;
- the wheel is an escape wheel, an intermediate wheel or a fourth wheel;
- a plurality of recesses per face can be considered.

The invention further relates to an escapement system comprising a wheel in accordance with the invention.

The invention further relates to a horological movement comprising such an escapement system or a wheel for an escapement system in accordance with the invention.

BRIEF DESCRIPTION OF THE FIGURES

Other features and advantages of the invention will become apparent upon reading the following detailed description given by way of a non-limiting example, and with reference to the accompanying drawings, in which.

DETAILED DESCRIPTION OF THE INVENTION

The invention relates to a wheel for an escapement system, such a wheel being, for example, an escape wheel, an intermediate wheel or a fourth wheel. In the following description, the escape wheel is chosen as a descriptive example for an easier reading of the invention. It is clear that a person skilled in the art would have no difficulty in producing an intermediate wheel or a fourth wheel in a similar way.

Figure 1:
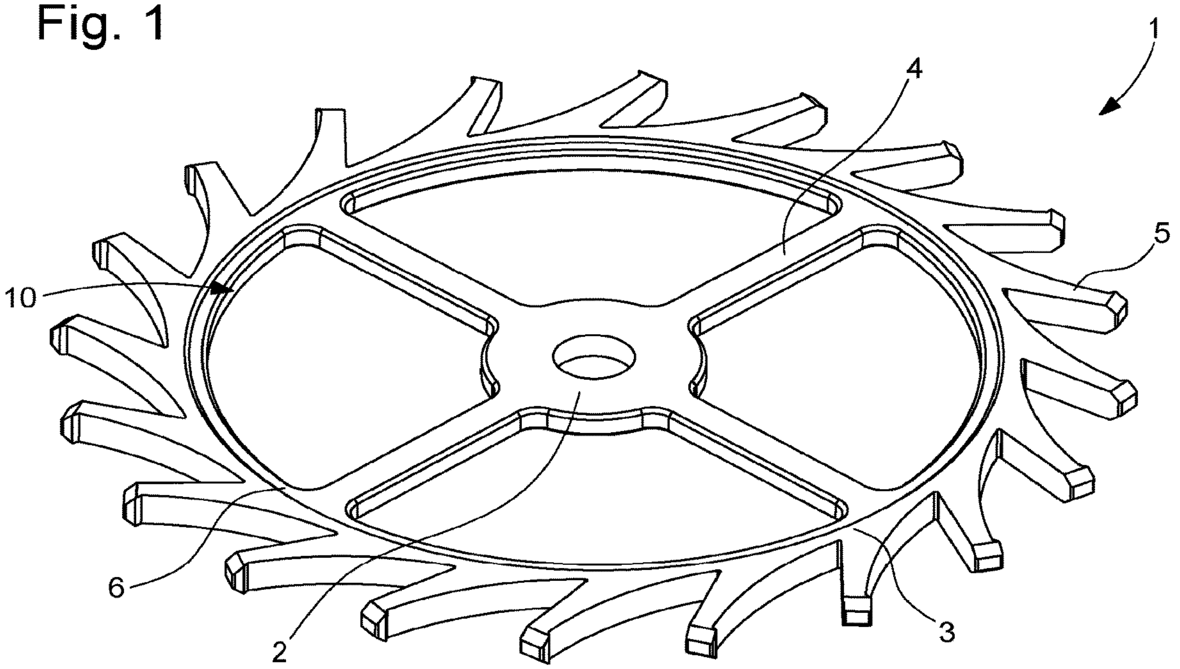
FIG. 1 shows a perspective view of an escape wheel according to the invention.
Figure 3:
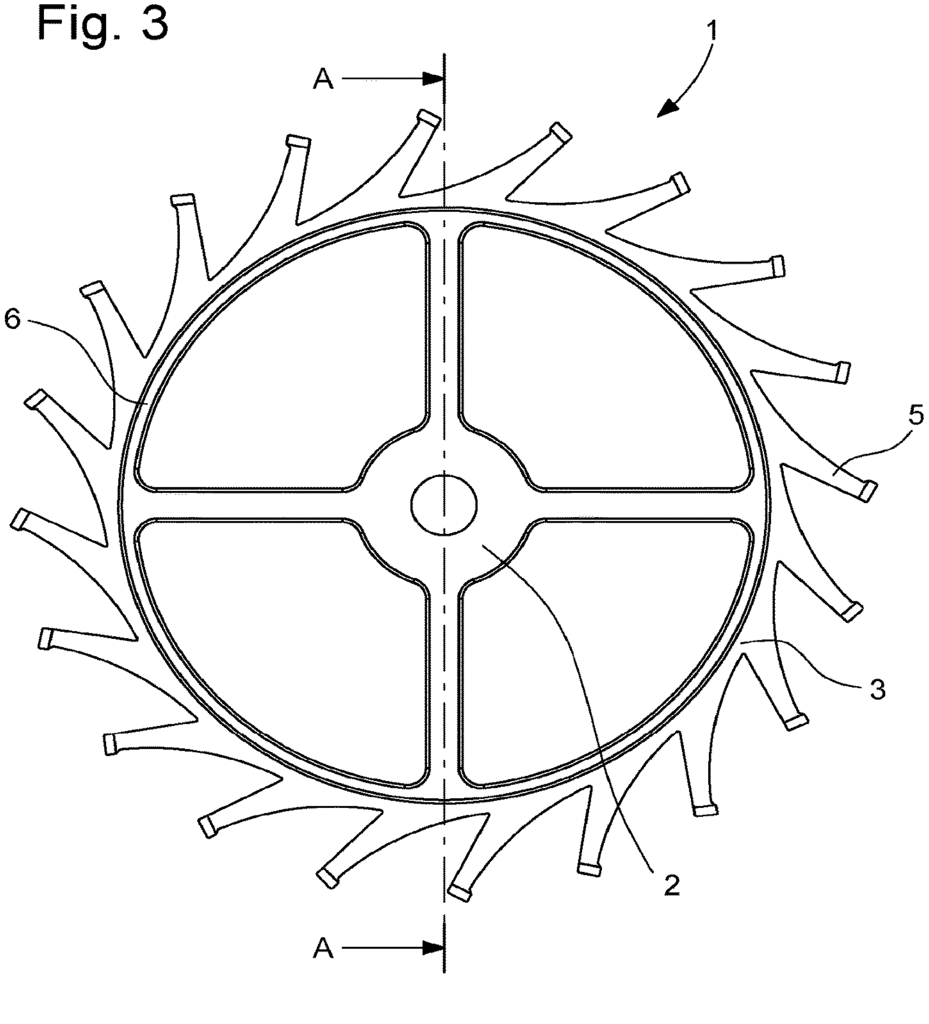
FIG. 3 shows a top view of the escape wheel according to the invention.
Figure 2:
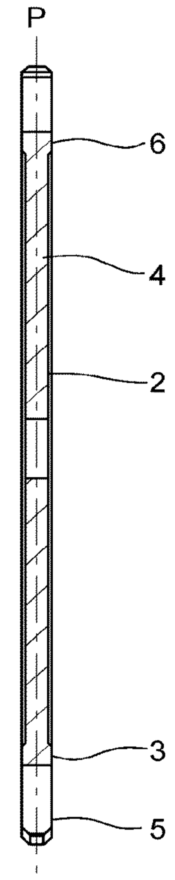
FIG. 2 shows a sectional view along the A-A axis of the escape wheel in FIG. 1.

FIG. 1 shows an escape wheel 1 according to the present invention, conventionally comprising a hub 2 connected to a felloe 3 by radial arms 4, and teeth 5 evenly distributed around the periphery of the felloe 3 and extending in directions orthoradial to an axis of rotation of the escape wheel 1. The escape wheel 1 comprises at least two arms 4, and preferably four arms 4. It goes without saying that other configurations can be considered, such as an escape wheel with three arms 4.

The escape wheel 1 is made of a material selected from steel, silicon or a metal alloy, or any other conventional material known to a person skilled in the art for producing components for timepieces.

In the present text, a plane P is defined, which is perpendicular to the axis of rotation of said escape wheel 1 and halfway through the thickness of the escape wheel. Furthermore, the term "thickness" used herein refers to a dimension considered in a direction parallel to the axis of rotation of the escape wheel 1.

As shown in FIG. 1, each of the teeth 14 has an end with at least one bevel.

According to the invention, the escape wheel 1 comprises at least one recess 10 formed on at least one of the faces thereof, namely on the front face and/or the rear face, the recess 10 extending from the felloe 3 to the hub 2. According to the needs of the person skilled in the art, the hub 2 can have the same thickness as the felloe 3 such that the wheel 1 is more solid at the hub and so as to avoid deformations when it is placed on a staff.

The term 'recess' is understood to mean a hollow, for example a circular hollow, made in the plate of the wheel 1.

The front face and rear face are understood to mean the faces visible from the top and from the bottom of the escape wheel 1.

The escape wheel has a thickness of at least 0.10 mm and the one or more recesses 10 have a height between 0.02 mm and 0.05 mm. The thickness of the escape wheel 1 at the recess 10 is typically between 0.05 mm and 0.10 mm.

As can be seen, the at least one recess 10 extends partly over the felloe 3 and forms a border 6 at the edge of the felloe of at least 0.02 mm. With such an arrangement, the felloe 3 retains a portion of its thickness at the periphery of the escape wheel, thus maintaining its rigidity.

According to one embodiment of the invention, the escape wheel 1 comprises a recess 10 on each of the faces thereof, namely on the front face and on the rear face.

According to one embodiment of the invention, the recesses 10 can be provided such that they are symmetrical relative to the horizontal plane P in which the escape wheel 1 lies and which is formed by the arms 4 and the felloe 3 of the escape wheel 1. 'Symmetrical' is understood to mean that each recess has the same diameter and height on each face of the escape wheel. For example, the two recesses 10 can have a diameter of 3.3 mm and a height of 0.04 mm.

According to another embodiment of the invention, the recesses 10 can be provided such that they are asymmetrical relative to the horizontal plane P in which the escape wheel 1 lies and which is formed by the arms 4 and the felloe 3 of the escape wheel 1. 'Asymmetrical' is understood to mean that each recess has a different height on each face of the escape wheel, but the same diameter. For example, the two recesses 10 can have the same diameter and can each have a height of 0.02 mm and 0.05 mm.

Other configurations of the recesses 10 can of course be considered according to the needs of the person skilled in the art without having to make any particular effort to produce the escape wheel 1. For example, the front face or the rear face can have a plurality of recesses, such as one recess per inter-arm gap.

The at least one recess 10 of the escape wheel 1 can be produced by means of methods well known to a person skilled in the art, for example by milling, turning, sinking, laser machining, DRIE or even LIGA, depending on the material chosen to manufacture the wheel 1.

The invention further relates to an escapement system comprising a wheel 1 in accordance with the invention. The wheel of the escapement system is an escape wheel, an intermediate wheel or a fourth wheel.

The invention further relates to a horological movement comprising an escapement system or a wheel in accordance with the invention.

Thanks to these different aspects of the invention, an escape wheel with reduced inertia which is easier and less expensive to produce than a skeletonised escape wheel, for example, can be produced.

It goes without saying that the present invention is not limited to the example shown and that various alternatives and modifications that may be apparent to a person skilled in the art can be made thereto, while still remaining within the scope of the invention as defined by the claims.

The invention claimed is:

1. A wheel for an escapement system comprising:

a hub configured to be mounted with a staff for rotation therewith, the staff configured to be subjected to a mechanical torque;

a felloe;

at least two arms extending from the hub to the felloe; and a toothing formed by a plurality of teeth, wherein said wheel for the escapement system includes a front face and a rear face opposite to the front face and includes at least one recess on each of the front and rear faces thereof, the at least one recess extending from the felloe to the hub, and wherein the recesses on the front face and the rear face are asymmetrical relative to a horizontal plane formed by the arms and the felloe of the escape wheel such that a height of the recess on the front face is different than a height of the recess on the rear face.

2. The wheel for the escapement system according to claim 1, wherein the wheel has a thickness of at least 0.10 mm.

3. The wheel for the escapement system according to claim 1, wherein the at least one recess has a height of between 0.02 mm and 0.05 mm.

4. The wheel for the escapement system according to claim 1, wherein the at least one recess extends partly over the felloe and forms a border at an edge of the felloe of at least 0.02 mm.

5. The wheel for the escapement system according to claim 1, wherein the wheel comprises at least two arms.

6. The wheel for the escapement system according to claim 1, wherein the recesses are symmetrical relative to a horizontal plane formed by the arms and the felloe of the escape wheel.

7. The wheel for the escapement system according to claim 1, wherein the wheel is made of a material selected from steel, silicon or a metal alloy.

8. The wheel for the escapement system according to claim 1, wherein said at least one recess is produced by milling, turning, sinking, laser machining, DRIE or LIGA.

9. The wheel for the escapement system according to claim 1, wherein the wheel is an escape wheel, an intermediate wheel or a fourth wheel.

10. An escapement system comprising the wheel for the escapement system according to claim 1.

11. A horological movement comprising the escapement system according to claim 10.

12. A horological movement comprising the escape wheel according to claim 1.

* * * * *